United States Patent [19]
Johne

[11] Patent Number: 4,786,217
[45] Date of Patent: Nov. 22, 1988

[54] METAL-CUTTING TOOL

[75] Inventor: Frank Johne, Lohne, Fed. Rep. of Germany

[73] Assignee: J. Kuhn GmbH & Co. Prazisionswerkzeug KG., Dorsten, Fed. Rep. of Germany

[21] Appl. No.: 45,057

[22] PCT Filed: Aug. 23, 1986

[86] PCT No.: PCT/DE86/00339
§ 371 Date: Apr. 28, 1987
§ 102(e) Date: Apr. 28, 1987

[87] PCT Pub. No.: WO87/01319
PCT Pub. Date: Mar. 12, 1987

[30] Foreign Application Priority Data

Aug. 28, 1985 [DE] Fed. Rep. of Germany ....... 3530696

[51] Int. Cl.⁴ .......................................... B23B 29/034
[52] U.S. Cl. .................... 408/156; 408/161; 408/179; 407/9; 407/45
[58] Field of Search ............. 408/154, 156, 159, 161, 408/168, 179, 180, 153, 155; 407/33, 44, 45, 8, 9, 10, 89, 109, 110, 105

[56] References Cited

U.S. PATENT DOCUMENTS

| 3,102,441 | 9/1963 | Milewski | 408/146 |
| 3,236,125 | 2/1966 | Lundgren | 408/158 |
| 3,276,101 | 10/1966 | Plein | 408/156 |
| 3,381,553 | 5/1968 | Lutz | 408/168 |
| 3,427,904 | 2/1969 | Arendt | 407/9 |
| 3,977,194 | 8/1976 | Klee et al. | 407/9 |
| 4,428,704 | 1/1984 | Kalokhe | 407/45 |

FOREIGN PATENT DOCUMENTS

| 146705 | 6/1952 | Australia | 408/161 |
| 709265 | 1/1980 | U.S.S.R. | 407/10 |

Primary Examiner—Gil Weidenfeld
Assistant Examiner—Daniel W. Howell
Attorney, Agent, or Firm—Holman & Stern

[57] ABSTRACT

A tool for metal-cutting comprises a holder (3) on which is mounted in its front part (3a) a cutting plate (6) and which is formed together with a base body (2) as an integral unit by being connected rigidly to the base body (2) in the region of its rear end (3b), a perforation (9) in the holder forming a parallel-type spring arrangement so that the holder is resiliently deflectable relative to a support (11) formed by the base body (2), and an adjustment device for deflecting the holder in use as desired.

20 Claims, 1 Drawing Sheet

METAL-CUTTING TOOL

CROSS REFERENCE TO RELATED APPLICATION(S)

This U.S. application stems from PCT International Application No. PCT/DE86/00339 fled Aug. 23, 1986

BACKGROUND OF THE INVENTION

1. Field of the Invention

This invention relates to a tool.

2. Description of the Prior Art

A tool of this type is known from FIG. 1 of U.S. Pat. No. 3,236,125. In this patent the holder is secured directly by means of the securing screw in a recess of a boring bar, the holder abutting with a rear lateral edge against the surface of the recess forming the support, while a forcing screw which is screwed into the front portion of the holder abuts against a corresponding point on the surface of the recess. If the holder is curved to some extent for radial adjustment of the cutting plate position, a horizontal swing of the holder also occurs at the same time in its front part, thus causing an undesirable change in what is known as the setting angle. In order to overcome this disadvantage, U.S. Pat. No. 3,236,125 proposes a basically different design for a tool holder. This design means that there is no resilient deformation of the holder, but a change in the clearance of one support face on the boring bar is effected by displacing a wedge piece which corresponds approximately in dimension to the holder. The wedge piece and the container have inclined faces with respect to the support face. The longitudinal adjustment of the wedge piece is carried out by means of an eccentric arrangement located in the holder.

The adjustment of this known holder takes place using a special device, for which purpose the holder must be removed from the boring bar. In the operating position, adjustment or readjustment cannot be performed on the boring bar, because the holder is screwed securely onto the boring bar together with the wedge piece, so that no relative movement between the holder and the wedge piece is then possible.

BRIEF SUMMARY OF THE INVENTION

The object of the invention is to overcome the above-referred-to existing shortcomings and disadvantages and to provide a tool of the above-described type, which permits slight radial adjustment of the cutting plate both in the assembled state and the dismantled state, without there being an unacceptable alteration in the setting angle (kappa) as it is known. The tool is furthermore simple in design and also relatively small in construction, so that it can be used where space is limited, particularly as a fine boring element. Other related problems with which the invention deals will be seen from the description which follows in conjunction with the embodiments shown in the drawings.

A tool of this type comprises a compact cassette-type unit. Its dimensions are selected so that it is also suitable for installation in restricted space. Axial adjustment can also be carried out without further action as necessary. Taking this into account the tool is however distinguished by a particularly advantageous adjustability in a radial direction, without other dimensions being affected adversely, in particular the setting angle. This is achieved by designing the holder as a parallel spring arrangement. This means any embodiment where in use there is resilient deflection of parts of the holder, the head part of which, i.e. the part supporting the cutting plate, undergoes a substantially lateral displacement.

The invention is designed in such a way that the holder is substantially unloaded in the non-deflected position and a resilient restoring force which counteracts any deflection occurs only if the adjustment device is actuated (deflected) from a zero or starting position. Particularly advantageously the holder is however already held under initial stress to rest against the base body in the non-deflected position, so that freedom from play is guaranteed from the outset. This is achieved in that the holder forming a spring is pressed against the base body during the manufacture of the rigid connection to the said base body, the desired initial stress being generated and remaining after the connection has been made.

Various embodiments are possible for the perforation provided for this parallel spring arrangement. The perforation can be rectangular, particularly with recessed portions in the corner regions. In a highly favorable embodiment the perforation has the form substantially of a "Z".

The rigid connection of the rear end of the holder to the base body is effected particularly advantageously by means of one or more welding points. Other types of connection are not however excluded.

As a material for the holder, any steel can be used which has the requisite properties in order to give the holder the required resilience or suitable spring resistance and at the same time provide the holder with sufficient rigidity. A steel with the folowing composition has proved to be particularly advantageous:

3.8 to 5.1% molybdenum,
17.8 to 18.2% nickel,
7.3 to 12.2% cobalt,
0.3 to 1.8% titanium, up to a maximum of 0.05% carbon, and the balance being iron with the usual steel impurities as well known to one skilled in the art.

A small amount of aluminum can also be present.

In the simplest case, the adjustment device can be comprised of a screw only, which engages in a thread in one part, particularly the holder, and is supported on the other part. In a particularly advantageous embodiment the adjustment device has a wedge located between a bearing surface and a support face and an adjustment screw engaging in a thread in the base body for retaining the wedge on the base body. The wedge preferably has a slope so that there is no automatic locking. The wedge can thus be pushed outwardly of the holder, by turning the screw in the unscrewing (outward) direction, by means of the high initial stress acting on the holder, i.e. the wedge continuously abuts against the underside of the screw head.

BRIEF DESCRIPTION OF THE DRAWINGS

Further details, features and advantages of the invention will be found in the following description of embodiments with reference to the accompanying drawings wherein.

Figure 5:
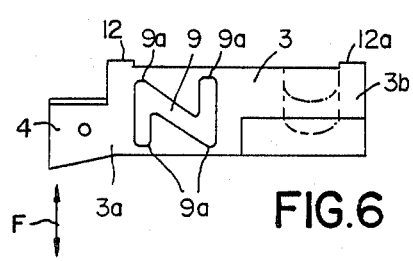
FIG. 5 is a cross-sectional view taken along line V—V in FIG. 1.

The tool shown comprises base body 2 partly in the shape of a C and a holder 3, which has a receiving means 4 for a cutting plate 6 in its front part 3a. The cutting plate 6 can be secured to the holder 3 by means of a screw or any other suitable holding or clamping device. The base body 2 together with the holder 3 forms a built-in unit, which can be attached quickly and with ease to a support, e.g. a boring bar B. For this purpose a securing screw 5 (FIG. 5) is used, which penetrates an oblong hole 7 formed by the base body 2 and the holder 3 and is screwed into a tapped hole 8 of the boring bar B.

The holder 3 is provided with a perforation 9, the design and arrangement of which is such that a parallel spring arrangement is achieved whereby the front part 3a of the holder 3 with the cutting plate receiving means 4 may be displaced under resilient deformation in the direction of the arrow F in a lateral direction when a corresponding force is exerted on this front portion, while the rear end 3b of the holder is locked.

Figure 1:
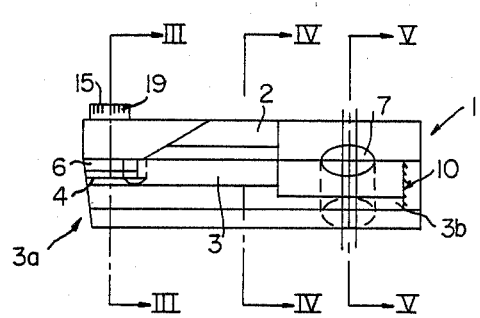
FIG. 1 is a side elevational view of the tool according to the invention.

In order to ensure this, the holder 3 is rigidly welded at its rear end 3b to the base body 2 after insertion thereinto. The welding point is designated by the number 10 in FIGS. 1 and 2. Advantageously if this weld or any other suitable rigid connection to the base body 2 is made the holder 3 is pressed against the base body 2 with a certain amount of force, in particular so that it abuts against a support face 11 of the base body 2 at two positions, these points being spaced apart transversely to the longitudinal direction of the holder by an amount such that the holder is subjected to resilient deformation at the stage when the holder is pressed against the base body. There is therefore initial stress, which is retained after the connection to the base body 2 has been made.

Figure 2:
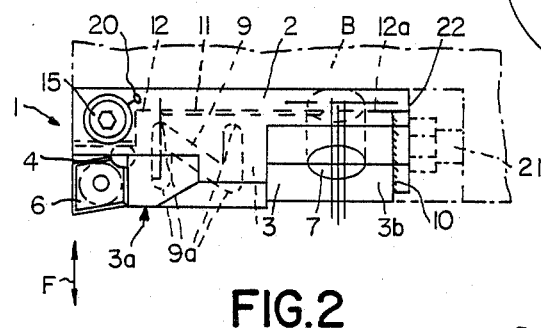
FIG. 2 is a top plan view of the tool as shown in FIG. 1.
Figure 6:
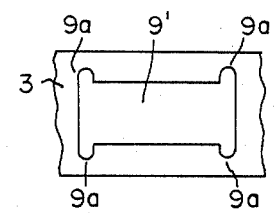
FIG. 6 is a top plan view of a holder before connection to the base body.

In the embodiment shown, the abutment points are formed by a lug 12 or the like provided in the region of the front part 3a of the holder 3 and a small projection 12a in the region of the rear end 3b (of FIGS. 2 and 6). The region of the holder 3 between these abutment points does not come into contact with the support face 11 of the base body 2. Rear projection 12a can also be dispensed with where appropriate, so that the holder 3 comes to rest at this point with its resilient surface against the base body.

The longitudinal hole 7 for the securing screw 5 in the embodiment shown penetrates both a part of the holder 3 and a part of the base body 2 and is produced advantageously by milling after the rigid connection between the holder and base body has been made.

Figure 3:
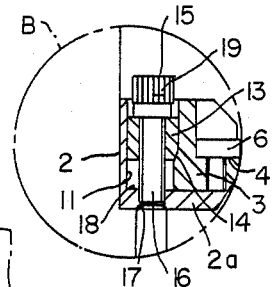
FIG. 3 is a cross-sectional view taken along line III—III in FIG. 1.
Figure 4:
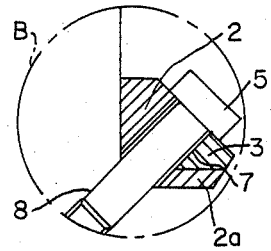
FIG. 4 is a cross-sectional view taken along line IV—IV in FIG. 1.
Figure 7:
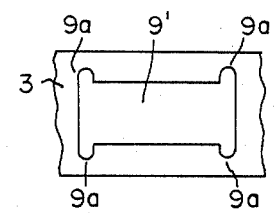
FIG. 7 is a view similar to FIG. 6 of a part of another embodiment of a holder.

The perforation 9 in the holder 3 used to obtain the parallel spring behavior thereof is Z-shaped in the embodiment shown in FIGS. 2 and 6, which shape has proved to be highly advantageous. The regions 9a (FIG. 6) form to a certain degree the joints for the parallel displacement. The perforation can however be formed differently, and may have in particular substantially the form of a rectangle 9', as shown in FIG. 7.

to be able to adjust the cutting plate 6 in its radial position, i.e. in the direction of the arrow F, an adjustment device is associated with the front portion 3a of the holder 3. As can be seen particularly in FIG. 3, the adjustment device has a wedge 13, which on one side abuts against the support face 11 of the base body 2 and on the other side abuts with a wedge face 14 against a correspondingly inclined pressure face on the holder 3. The head 15 of an adjustment screw 16 acts on the wedge 13 from above, which screw engages in a tapped hole 17 in the lower shank 2a of the base body 2. If the wedge 13 is displaced downwards by means of the adjustment screw 16, it presses the holder 3 radially outwards against the initial stress force. If the adjustment screw is turned in the other direction, it releases the wedge 13 in the opposite direction of movement. The angle of the wedge 13 is selected so that there is no automatic locking. The wedge 13 can then also follow the adjustment screw when the screw is loosened due to the high initial stress of the holder, the holder 3 being moved radially inwards with the cutting plate 6. As a result of the initial stress force of the holder, a secure abutment is guaranteed for all parts every time there is an adjustment or re-adjustment.

The sloping path of the wedge 13 is restricted by a stop, so that overstressing of the holder, i.e. an excessively high bending strain resulting from too great a deflection, is prevented. In the embodiment shown the stop is formed directly by the upper side 18 of the lower element 2a of the base body.

On the head of the adjustment screw 16, graduations 19 are provided (FIGS. 1 and 3) and on the base body 2 a reference mark 20 is provided, so that the amount of the adjustment can be read.

The oblong hole 7 permits axial adjustment of the tool 1 relative to its support. To this end, as shown in FIG. 2, an adjustment screw 21 can be provided in a known manner, which either engages in a tapped hole of the boring bar B or the like and forms the abutment for a rear end face 22 of the tool 1 with its head, or conversely is screwed into a tapped hole of the tool, the head then abutting against a support face of the boring bar B or the like.

All features mentioned in this desrciption or shown in the drawings should, as far as the prior art permits, be considered as falling within the scope of the invention, either singly or in combination.

I claim:

1. In a metal-cutting tool including a holder having a front end and a rear end, at least one cutting plate receiving means on the holder, a hole through the holder in the region between the frontend and rear end for penetration by a securing screw for securing the holder to a boring bar, the holder being resiliently deformable in the cutting plate receiving part, and an adjusting means for adjusting the deformable part of the holder relative to the boring bar, the improvement wherein:

the holder comprises a cartridge having a longitudinally extending base body and a deflectable part, said deflectable part having a front part supporting the cutting plate and a rear end, said rear end being rigidly connected in the region thereof to said base body so that said front part is resiliently deflectable relative to said base body; and a substantially slot-shaped aperture is provided in said deflectable part having a configuration forming a plurality of joints and a plurality of parallel springs in said deflectable part connecting said front part and rear end thereof so that said front part and cutting plate thereon are adjustable by said adjusting means in a direction substantially radially relative to the boring bar.

2. A tool as claimed in claim 1 wherein:
the holder is comprised of a steel with the following composition:
3.8 to 5.1% molybdenum
17.8 to 18.2% nickel
7.3 to 12.2% cobalt
0.3 to 1.8% titanium
the balance is iron and impurities.

3. A tool as claimed in claim 2 wherein:
said steel further contains up to 0.3% aluminum.

4. The tool as claimed in claim 1 wherein:
said deflectable part is connected to said base body so that said deflectable part is under initial stress when undeflected.

5. The tool as claimed in claim 1 wherein:
said configuration of said aperture is substantially rectangular.

6. The tool as claimed in claim 4 wherein:
said configuration of said aperture is substantially rectangular.

7. The tool as claimed in claim 1 wherein:
said configuration of said aperture is substantially Z-shaped.

8. The tool as claimed in claim 4 wherein:
said configuration of said aperture is substantially Z-shaped.

9. The tool as claimed in claim 1 wherein:
said deflectable part is connected to said base body by a welded connection.

10. The tool as claimed in claim 4 wherein:
said deflectable part is connected to said base body by a welded connection.

11. A tool as claimed in claim 5 wherein:
the holder is comprised of a steel with the following composition:
3.8 to 5.1% molybdenum
17.8 to 18.2% nickel
7.3 to 12.2% cobalt
0.3 to 1.8% titanium
the balance is iron and impurities.

12. A tool as claimed in claim 7 wherein:
the holder is comprised of a steel with the following composition:
3.8 to 5.1% molybdenum
17.8 to 18.2% nickel
7.3 to 12.2% cobalt
0.3 to 1.8% titanium
the balance is iron and impurities.

13. A tool as claimed in claim 1 wherein said adjusting means further comprises:
an adjusting screw between said base body and deflectable part extending substantially perpendicular to the longitudinal direction of extension of said base body;
a pressure face on said deflectable part;
a support face on said base body;
a wedge member disposed between said pressure face and support face;
a hole through said wedge member, said adjusting screw extending through said hole; and
a threaded hole in said base body, said adjusting screw engaging in said threaded hole, so that rotation of said adjusting screw displaces said wedge axially with respect to said adjusting screw.

14. A tool as claimed in claim 13 and further comprising:
a wedging surface on said pressure face slidably engaging said wedge member.

15. A tool as claimed in claim 14 and further comprising:
a wedging surface on said wedge member cooperatively engaging said wedging surface on said pressure face.

16. A tool as claimed in claim 4 wherein said adjusting means further comprises:
an adjusting screw between said base body and deflectable part extending substantially perpendicular to the longitudinal direction of extension of said base body;
a pressure face on said deflectable part;
a support face on said base body;
a wedge member disposed between said pressure face and support face;
a hole thorugh said wedge member, said adjusting screw extending through said hole; and
a threaded hole in said base body, said adjusting screw engaging in said threaded hole, so that rotation of said adjusting screw displaces said wedge axially with respect to said adjusting screw.

17. A tool as claimed in claim 16 and further comprising:
a wedging surface on said pressure face slidably engaging said wedge member so that said wedge member is non-lockable and returns toward a non-deflecting position when said adjusting screw is rotated outwardly due to said initial stress.

18. A tool as claimed in claim 14 and further comprising:
a stop means on the holder for limiting inward deflecting movement of said wedge member.

19. A tool as claimed in claim 13 and further comprising:
a stop means on the holder for limiting inward deflecting movement of said wedge member.

20. A tool holder as claimed in claim 13 and further comprising:
a head on said adjusting means;
graduation index markings on said head; and
a reference mark on said base body substantially adjacent said index markings for cooperation therewith in determining the amount of rotation of said adjusting screw.

* * * * *